US012682496B1

(12) United States Patent
Gupta et al.

(10) Patent No.: US 12,682,496 B1
(45) Date of Patent: Jul. 14, 2026

(54) GUIDING CAMERA POSITIONING DURING IMAGE CAPTURE IN AN ELECTRONIC DEVICE

(71) Applicant: MOTOROLA MOBILITY LLC, Wilmington, DE (US)

(72) Inventors: Ranjeet Gupta, Aurora, IL (US); Rahul Bharat Desai, Hoffman Estates, IL (US); Daniel M Vacura, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 19/020,715

(22) Filed: Jan. 14, 2025

(51) Int. Cl.
   G06T 7/80 (2017.01)
   G06F 9/451 (2018.01)
   G06V 40/16 (2022.01)

(52) U.S. Cl.
   CPC ............... G06T 7/80 (2017.01); G06F 9/451 (2018.02); G06V 40/161 (2022.01)

(58) Field of Classification Search
   CPC .......... G06T 7/80; G06F 9/451; G06V 40/161
   USPC ........................................... 348/187
   See application file for complete search history.

(56) References Cited

U.S. PATENT DOCUMENTS

| | | | | | |
|---|---|---|---|---|---|
| 11,115,591 | B2 * | 9/2021 | Wei | ......................... | H04N 23/45 |
| 11,341,768 | B2 * | 5/2022 | Huang | ................. | G06V 40/165 |
| 12,413,842 | B2 * | 9/2025 | Kim | ..................... | H04N 23/611 |
| 2017/0052588 | A1 * | 2/2017 | Zhang | ..................... | G06F 3/005 |
| 2017/0180648 | A1 * | 6/2017 | Yang | ................... | H04N 23/661 |
| 2022/0366664 | A1 * | 11/2022 | Youn | ......................... | G06T 3/40 |
| 2024/0114229 | A1 | 4/2024 | Agrawal | | |
| 2024/0215818 | A1 * | 7/2024 | Tomasi | .................... | A61B 3/10 |

OTHER PUBLICATIONS

International Search Report and Written Opinion, International Application No. PCT/US2025/022196, Jun. 12, 2025.

* cited by examiner

*Primary Examiner* — Trang U Tran
(74) *Attorney, Agent, or Firm* — Isidore PLLC

(57) ABSTRACT

An electronic device, a method and a computer program product for guiding positioning of the electronic device during image capturing. The method includes, while an electronic device is in an image capturing mode using a camera, determining if a first preview image contains a face of a subject whose image is to be captured. In response to determining the preview image contains the face of the subject, the method includes calculating a deviation angle based on an eye level of the target subject and a projection line of a lens of the camera and determining if the deviation angle is within a deviation angle range. In response to determining the deviation angle is not within the deviation angle range, the method includes determining a first direction to move the electronic device to reduce the deviation angle and outputting an indication to move the electronic device in the first direction.

20 Claims, 10 Drawing Sheets

101

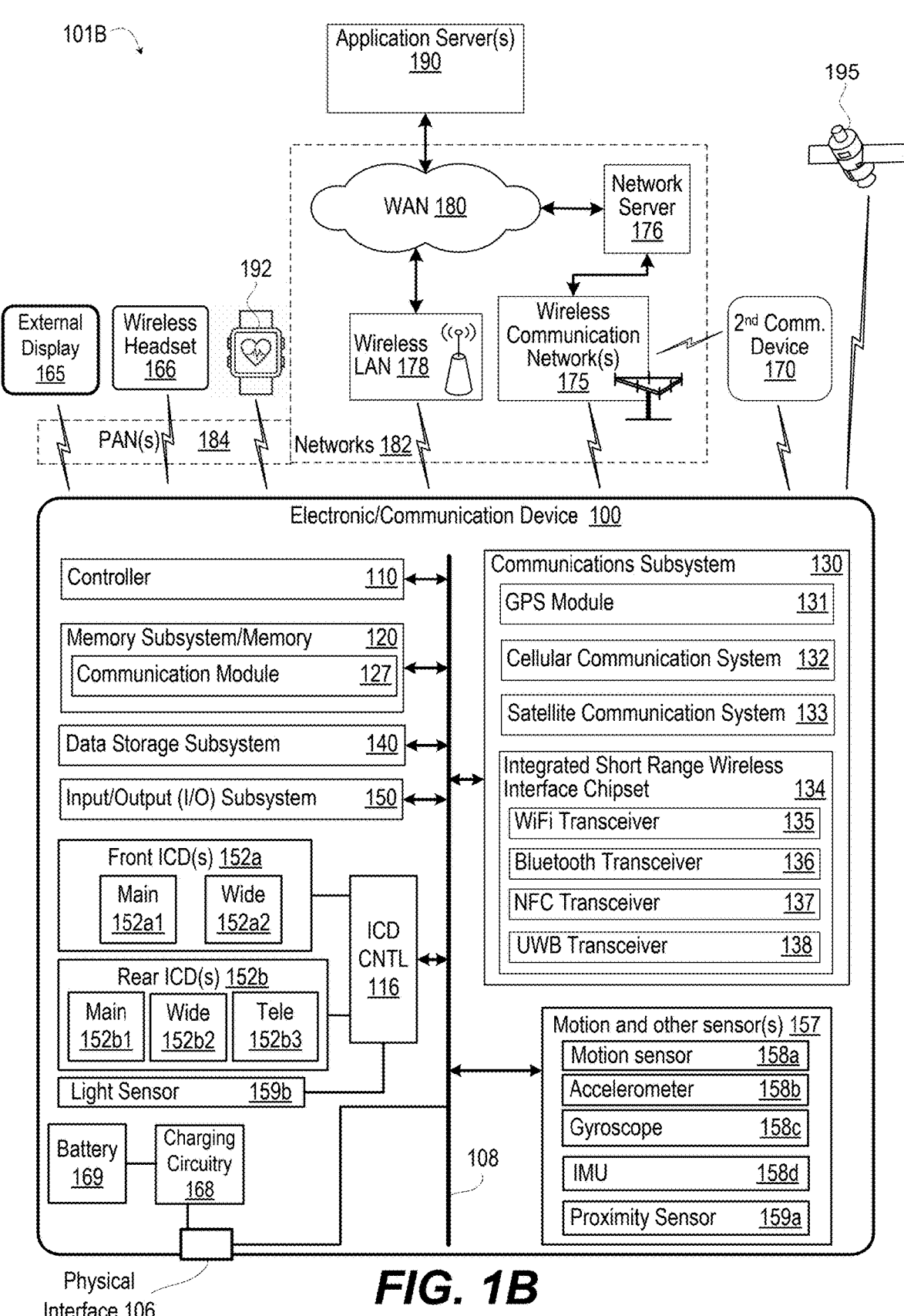

101B

Application Server(s) 190

195

WAN 180

Network Server 176

192

External Display 165

Wireless Headset 166

Wireless LAN 178

Wireless Communication Network(s) 175

2nd Comm. Device 170

PAN(s) 184

Networks 182

Electronic/Communication Device 100

Controller 110

Memory Subsystem/Memory 120
Communication Module 127

Data Storage Subsystem 140

Input/Output (I/O) Subsystem 150

Front ICD(s) 152a
Main 152a1
Wide 152a2

ICD CNTL 116

Rear ICD(s) 152b
Main 152b1
Wide 152b2
Tele 152b3

Light Sensor 159b

Battery 169

Charging Circuitry 168

Physical Interface 106

Communications Subsystem 130
GPS Module 131
Cellular Communication System 132
Satellite Communication System 133
Integrated Short Range Wireless Interface Chipset 134
WiFi Transceiver 135
Bluetooth Transceiver 136
NFC Transceiver 137
UWB Transceiver 138

Motion and other sensor(s) 157
Motion sensor 158a
Accelerometer 158b
Gyroscope 158c
IMU 158d
Proximity Sensor 159a

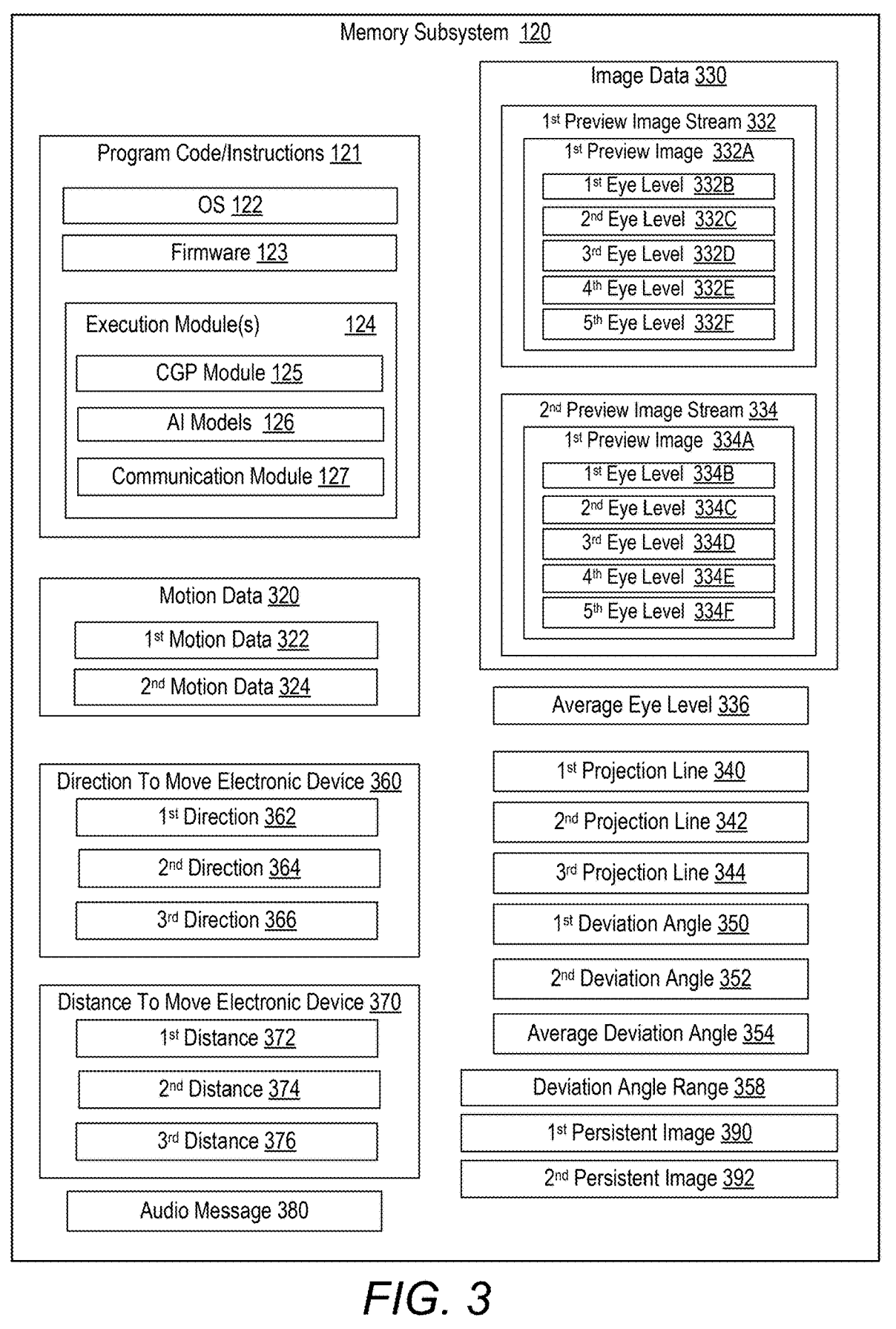

Memory Subsystem 120

Image Data 330

1st Preview Image Stream 332

1st Preview Image 332A

- 1st Eye Level 332B
- 2nd Eye Level 332C
- 3rd Eye Level 332D
- 4th Eye Level 332E
- 5th Eye Level 332F

2nd Preview Image Stream 334

1st Preview Image 334A

- 1st Eye Level 334B
- 2nd Eye Level 334C
- 3rd Eye Level 334D
- 4th Eye Level 334E
- 5th Eye Level 334F Average Eye Level 336

1st Projection Line 340

2nd Projection Line 342

3rd Projection Line 344

1st Deviation Angle 350

2nd Deviation Angle 352

Average Deviation Angle 354

Deviation Angle Range 358

1st Persistent Image 390

2nd Persistent Image 392

Program Code/Instructions 121

OS 122

Firmware 123

Execution Module(s)    124

CGP Module 125

AI Models 126

Communication Module 127

Motion Data 320

1st Motion Data 322

2nd Motion Data 324

Direction To Move Electronic Device 360

1st Direction 362

2nd Direction 364

3rd Direction 366

Distance To Move Electronic Device 370

1st Distance 372

2nd Distance 374

3rd Distance 376

Audio Message 380

*FIG. 3*

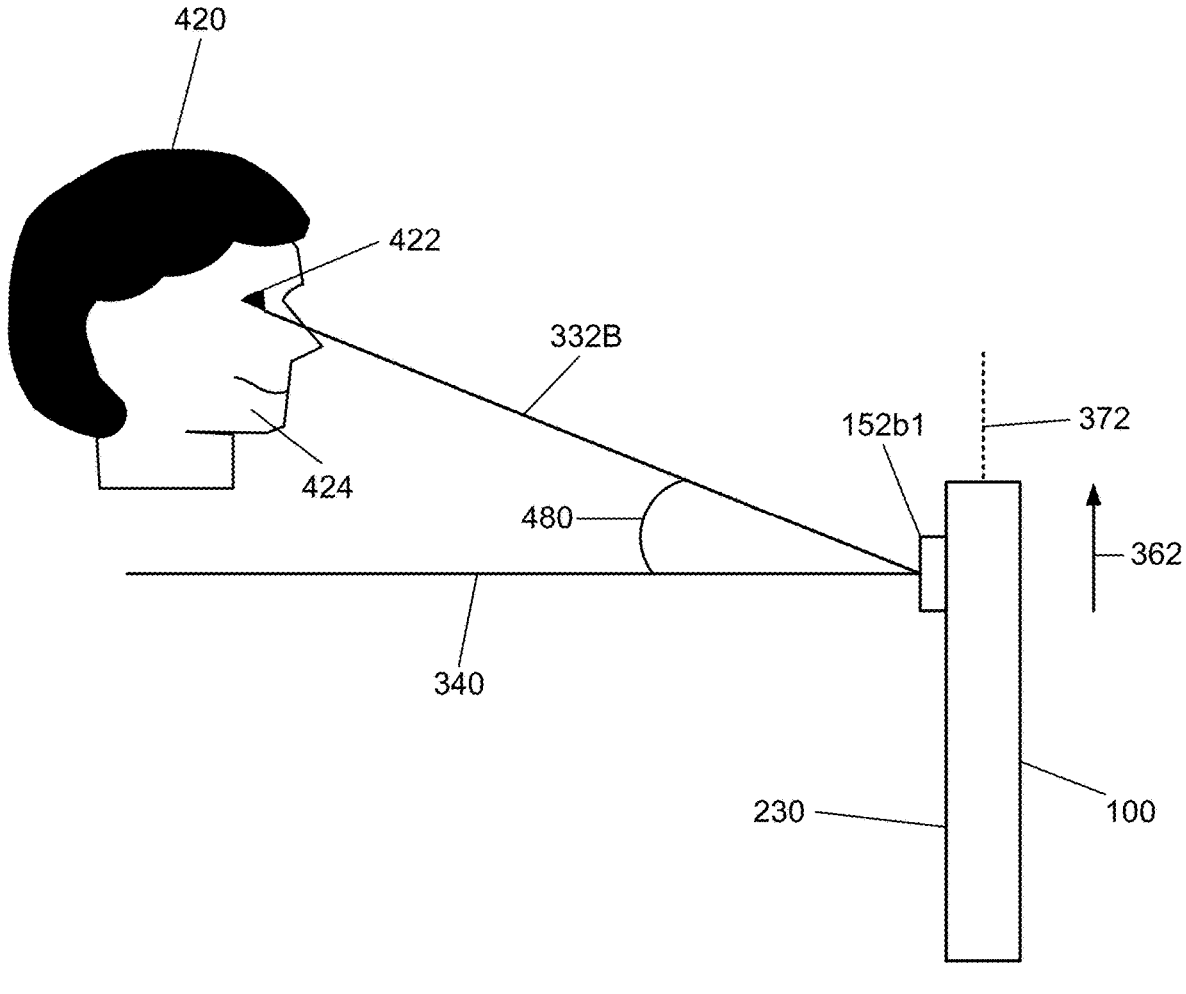
*FIG. 4B*

GUIDING CAMERA POSITIONING DURING IMAGE CAPTURE IN AN ELECTRONIC DEVICE

BACKGROUND

1. Technical Field

The present disclosure generally relates to electronic devices and in particular to capturing images using an electronic device.

2. Description of the Related Art

Electronic devices, such as mobile phones, tablets, and laptops, are widely used for video, voice, and text communication and for data transmission. Many conventional electronic devices have at least one front facing camera and one or more rear facing cameras, along with one more display devices. Electronic devices with cameras can be used to capture various images within a field of view of the camera. An electronic device user can choose to capture an image of friends, objects, scenery, or themselves using one of the cameras.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 1B is an additional block diagram representation of the electronic device of FIG. 1A presenting additional components, including components for wireless communications with other devices and several image capturing devices, according to one or more embodiments;

FIG. 3 is a block diagram of example contents of the memory subsystem of the example electronic device of FIG. 1A-1B (FIG. 1), which configures the electronic device to complete the various processes described herein, according to one or more embodiments;

FIG. 4B illustrates an example electronic device determining an eye level and a projection line, according to one or more embodiments;

DETAILED DESCRIPTION

Figure 1A:
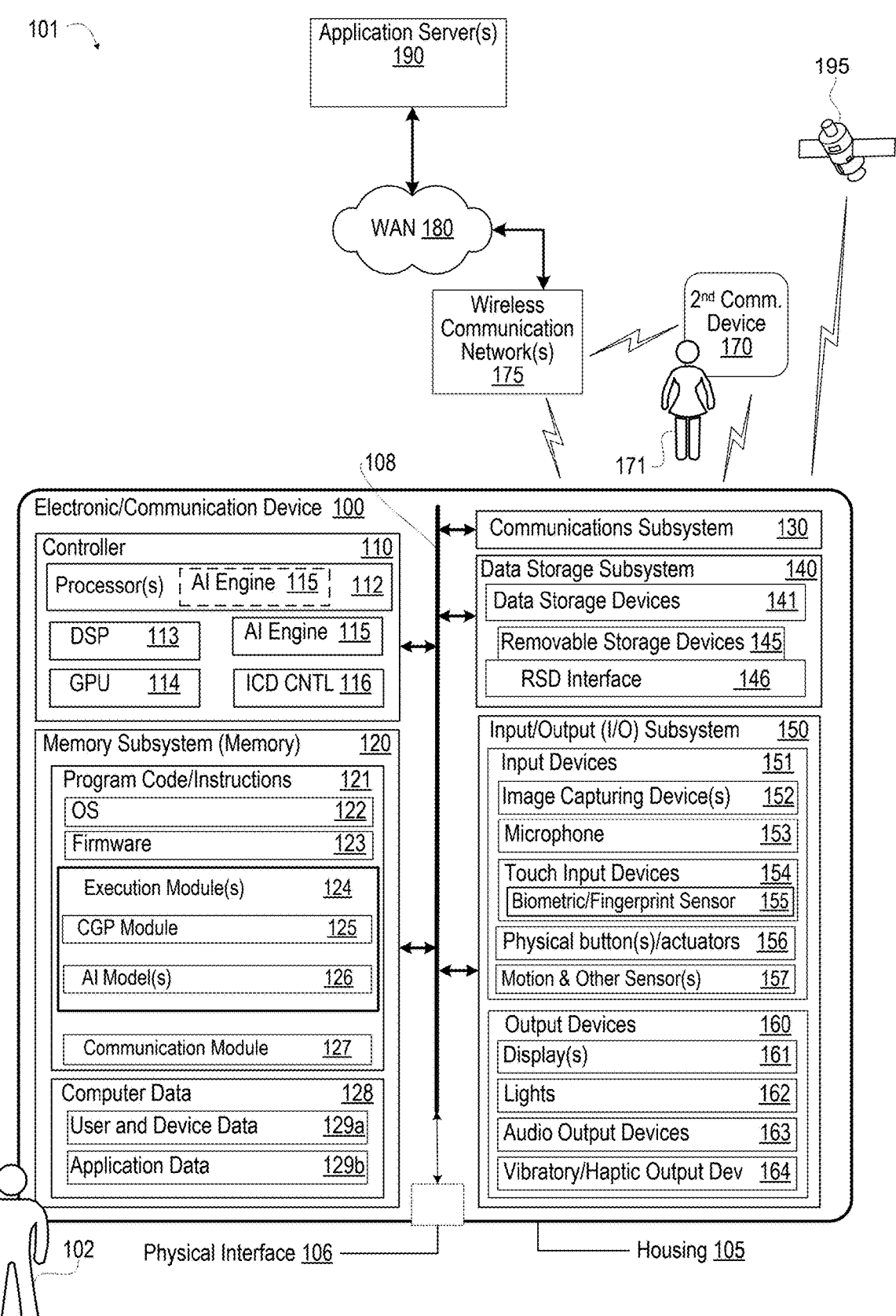
FIG. 1A presents a functional block diagram of example components of an electronic device in a communication environment and having hardware and software components that enable the features of the present disclosure to be advantageously implemented, according to one or more embodiments.

According to one or more aspects of the present disclosure, the illustrative embodiments provide an electronic device, a method, and a computer program product for guiding positioning of the electronic device during image capturing. The electronic device can output an indication to a user of the electronic device to move the electronic device in a specific direction to reduce an offset angle between a camera lens of the electronic device and the eyes of a subject whose image is to be captured.

An electronic device with a camera can capture images including the faces of people during a photographing process. If the camera lens is not aligned with the eyes of the subject whose image is being captured, the facial features of the subject can be distorted. The photograph of the subject can have a distorted facial proportion, such as a large nose, a skinny forehead or a thick neck, due to the angle created between the camera lens and eye level of the subject when not in alignment. The greater the angle, the greater the distortion and the smaller the angle, the smaller the distortion.

The embodiments disclosed herein addresses and overcome the aforementioned problems of an electronic device with a camera used to photograph people from camera angles that result in facial/image distortion. One or more aspects of the embodiments disclosed herein enable an electronic device to determine if a preview image contains a face of a subject whose image is to be captured. The embodiments further enable the electronic device to calculate a deviation angle based on an eye level and a projection line of a lens of the camera and to determine if the deviation angle is within a deviation angle range. The embodiments enable the electronic device to, in response to determining the deviation angle is not within the deviation angle range, determine a first direction to move the electronic device to reduce the deviation angle and output an indication to move the electronic device in the first direction. An additional aspect of the embodiments disclosed herein enables the electronic device to autonomously capture an image, when the deviation angle is within the deviation angle range.

In a first embodiment, an electronic device includes at least one camera, including a first camera that has a first projection line from a lens of the first camera, based on an elevation level of the first camera relative to a surface of the earth. The electronic device includes at least one display, including a first display, and a memory having stored thereon a camera guiding and positioning (CGP) module for guiding positioning of the electronic device during image capturing. The electronic device includes at least one processor that is communicatively coupled to the at least one camera, the at least one display, and the memory, and which executes program code of the CGP module. The at least one processor is configured to cause the electronic device to, while the electronic device is in a first image capturing mode using the first camera, extract a first preview image from a first preview image stream being captured via the first camera. The at least one processor determines if the first preview image contains a face of at least one first subject whose image is to be captured. The at least one first subject has a first eye level, which is determined from the preview image. In response to determining the first preview image contains the face of the at least one first subject, the at least one processor calculates a first deviation angle based on the first eye level and the first projection line of the lens of the first camera. As an example, the first projection line can be a horizontal line relative to the earth's surface or to a surface on which the user of the electronic device is standing. The at least one processor determines if the first deviation angle is within a deviation angle range (e.g., +/−15 degrees). In response to determining the first deviation angle is not within the deviation angle range, the at least one processor determines a first direction to move the electronic device to reduce the first deviation angle such that, after being moved in the first direction, the electronic device is in an improved alignment with the face of the at least one first subject. The at least one processor outputs an indication to a user of the electronic device to move the electronic device in the first direction.

According to another embodiment, the method includes, while an electronic device is in a first image capturing mode using a first camera, extracting, via at least one processor, a first preview image from a first preview image stream being captured via the first camera. The method includes determining if the first preview image contains a face of at least one first subject whose image is to be captured. The at least one first subject having a first eye level. In response to determining the first preview image contains the face of the at least one first subject, the method includes calculating a first deviation angle based on the first eye level and a first projection line of a lens of the first camera and determining if the first deviation angle is within a deviation angle range. In response to determining the first deviation angle is not within the deviation angle range, the method includes determining a first direction to move the electronic device to reduce the first deviation angle such that, after being moved in the first direction, the electronic device is in an improved alignment with the face of the at least one first subject. The method includes outputting an indication to a user of the electronic device to move the electronic device in the first direction.

According to an additional embodiment, a computer program product includes a non-transitory computer readable storage device having stored thereon program code that, when executed by at least one processor of an electronic device having at least one camera and at least one display, the program code enables the electronic device to complete the functionality of the above-described method processes.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent within the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within electronic device 100 (FIG. 1A-1B) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural, functional, operational, or otherwise) on the described embodiments.

Referring now to the figures and beginning with FIG. 1A, there is illustrated a block diagram of an example electronic device 100 in a communication environment 101 and having hardware and software components, which enable the features of the present disclosure to be advantageously implemented, according to one or more embodiments. Examples of electronic device 100 can include, but are not limited to, mobile devices, a notebook computer, a mobile phone, a smart phone, a digital camera with enhanced processing capabilities, a smart watch, a tablet computer, and other types of electronic devices having at least one camera (or image capturing device).

Electronic device 100 generally includes controller 110, memory (or memory subsystem) 120, communication subsystem 130, data storage subsystem 140, input/output subsystem 150, all contained within or extended from an exterior surface of device housing 105. Controller 110 is shown communicatively connected/coupled via system interlink 108 with each of the subsystems 120, 130, 140, and 150, and is directly or indirectly connected with the individual components within each subsystem 120, 130, 140, and 150. System interlink 108 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components.

Controller 110 includes processor 112, which includes one or more central processing units (CPUs) or data processors. Processor 112 performs many of the features of controller 110 and references to features performed by controller 110 can be interchangeably referred to herein as features of processor 112, and vice-versa. In some embodiments, the various functions associated with controller 110 are integrated into processor 112, and accordingly, references made herein to controller and/or processor are understood to refer to one or both components as providing a single management component within the electronic device 100. For simplicity in describing the features of the electronic device 100, the operational functions provided by one or more of operational components within controller 110, including those provided by processor 112 are collectively described as being performed by controller 110. Collectively, components integrated within controller 110 support computing, classifying, processing, transmitting and receiving of data and information, and presenting of graphical and photographic images within a display.

As illustrated, controller 110 can also include one or more digital signal processors 113, graphics processing units (GPUs) 114, artificial intelligence (AI) engine 115, and image capturing device (ICD) controller 116. In some embodiments, the functionality of each of these additional processing components can be integrated with processor(s) 112. For example, processor 112 can, in some embodiments, include dedicated AI engine 115 and image signal processors (ISPs) (not shown).

Controller 110 manages, and in some instances directly controls, the various functions and/or operations of electronic device 100. These functions and/or operations include, but are not limited to including, application data processing, communication, location and navigation tasks, image processing, and signal processing. In one or more alternate embodiments, electronic device 100 may use hardware component equivalents for application data processing and signal processing. For example, electronic device 100 may use special purpose hardware, dedicated processors, general purpose computers, microprocessor-based computers, micro-controllers, optical computers, analog computers, dedicated processors and/or dedicated hard-wired logic. Controller 110 can, in some embodiments, also include a hardware acceleration (HA) unit, which can establish direct memory access (DMA) sessions to route network traffic to various elements within electronic device 100 without direct involvement from processor 112 and/or a device operating system 122.

Memory subsystem (or memory) 120 may include a combination of volatile and nonvolatile memory, such as random-access memory (RAM) and read-only memory (ROM). Memory subsystem 120 stores program code/instructions 121 for execution by processor 112 to configure processor 112 (and more generally electronic device 100) to provide the operational functions and features described herein. Program code/instructions 121 (or program code 121 for short) include instructions for an operating system (OS) 122, firmware 123, such as basic input/output system (BIOS) or Uniform Extensible Firmware Interface (UEFI). Program code 121 includes execution module(s) 124 that collectively provides the various features of the disclosure.

Execution module(s) 124 include, without limitation, camera guiding and positioning (CGP) module 125. CGP module 125 provides the features and operating functionality of the disclosed embodiments when the corresponding program instructions of CGP module 125 are processed by/within processor 112/controller 110. Specifically, CGP module 125 provides program instructions for guiding positioning of the electronic device during image capturing using a camera.

Execution modules 124 further includes AI model(s) 126. In one or more embodiments, processor 112 can utilize AI models 126 to provide AI functionality of processor-integrated AI engines 115. In other embodiments, AI models 126 are directly utilized by AI engine 115. In one or more embodiments, AI model 126 is integrated as a sub-module within CGP module 125 and is trained to support the AI features of CGP module 125. AI model(s) 126 may include an artificial neural network, a decision tree, a support vector machine, Hidden Markov model, linear regression, logistic regression, Bayesian networks, and so forth. AI model(s) 126 can be individually trained to perform specific tasks and can be arranged in different sets of AI models to generate different types of output. Training of AI model(s) 126 is the process by which AI models are trained to perform specific tasks or achieve certain objectives. The training involves providing the model with a large amount of data and allowing the model to learn from patterns and relationships within that data.

Each of the above-introduced module(s) and/or application(s) provides program instructions/code that are processed by processor 112 and which configures processor 112 (and/or controller 110) and/or other operational components of electronic device 100 to cause the electronic device 100 to perform specific operations and functions, as described herein. Descriptive names assigned to these modules add no functionality and are provided solely to assist in identify the underlying features performed by processing the different modules. For example, CGP module 125 can include program instructions that cause or configure processor 112 to cause electronic device 100 to guide positioning of the electronic device during image capturing. Other features provided by CGP module 125 are described in further detail throughout this disclosure.

Program code 121 can further include instructions/code for other applications (not shown) providing different features of/within electronic device 100. In one or more embodiments, program code 121 may be integrated into a distinct chipset or hardware module as firmware that operates separately from other executable program code. Portions of program code 121 may be incorporated into different hardware components that operate in a distributed or collaborative manner.

Memory subsystem 120 also includes computer data 128. During execution of program code 121, processor 112 may access, use, generate, modify, store, or communicate computer data 128, such as user and device data 129a and application data 129b. Computer data 128 may incorporate "data" that originated as raw, real-world "analog" information that consists of basic facts and figures. Computer data 128 includes different forms of data, such as numerical data, images, coding, notes, and financial data, as well as data presenting video, graphics, text, and images. Computer data 128 may originate at electronic device 100 or may be retrieved from a remote device via communications subsystem 130. Electronic device 100 may store, modify, present, or transmit computer data 128.

Communications subsystem 130 includes various components that enable electronic device 100 to communicate with external communication networks and other devices, such as second electronic device 170 and application server(s) 190, etc., via communications subsystem 130. According to one or more embodiments, communication module 127 presented within program code 121 includes instructions supporting the use of communications subsystem 130 to establish communication interfaces enabling communication by electronic device 100 with these external networks and devices.

Data storage subsystem 140 of electronic device 100 includes data storage device(s) 141. Controller 110 is communicatively connected, via system interlink 108, to data storage device(s) 141. Data storage subsystem 140 provides stored versions of program code 121 and computer data 128 on nonvolatile storage that is accessible by controller 110. The program code 121 can be loaded into memory 120 for execution/processing by controller 110. In one or more embodiments, data storage device(s) 141 can include hard disk drives (HDDs), optical disk drives, and/or solid-state drives (SSDs), etc.

Data storage subsystem 140 of electronic device 100 can include removable storage device(s) (RSD(s)) 145, which is received in RSD interface 146. Controller 110 is communicatively connected to RSD 145, via system interlink 108 through RSD interface 146. In one or more embodiments, RSD 145 is a non-transitory computer program product or computer readable storage device that stores program code and associated data, including a copy of CGP module 125 and AI model(s) 126, which may be executed by a processor associated with a user device, such as electronic device 100. Controller 110 can access data storage device(s) 141 or RSD(s) 145 to provision electronic device 100 with stored program code 121 and computer data 128 that, when executed/processed by processor 112, the program code configures processor 112 and/or more generally electronic device 100, to provide the various functions described herein.

I/O subsystem 150 includes input devices 151 such as, but not limited to, image capturing device(s) (ICDs) 152, microphone 153, and touch input devices 154 (e.g., touch screens, keys, or buttons) for use by user 102 to interface with electronic device 100. Touch input devices 154 can include a biometric/fingerprint sensor 155 for biometric input. Biometric/fingerprint sensor 155 can be used to read/receive biometric data, such as fingerprints, to identify or authenticate a user. In some embodiments, the biometric sensor 155 can supplement an ICD (camera), which captures images for user detection/identification via facial recognition.

Input devices 151 may include physical buttons/actuators 156 that can be located on a periphery of the device housing 105. Physical buttons 156 may provide controls for volume, power, and ICDs 152. Microphone 153 can also be referred to as an audio input device. In some embodiments, microphone 153 may be used for identifying a user via voiceprint, voice recognition, and/or other suitable techniques. Input devices 151 can also include one or more motion or other sensor(s) 157, which are further defined in the FIG. 1B description which follows.

With reference to FIG. 1B, as illustrated, motion and other sensor(s) 157 of electronic device 100 include, but are not limited to, one or more motion sensor(s) 158a, one or more accelerometers 158b, one or more gyroscopes 158c, inertial measurement unit (IMU) 158d, and proximity sensor 159a, etc. Motion sensor(s) 158a detect movement of electronic device 100 and provide motion data to processor 112 indicating the spatial orientation, position and movement of electronic device 100. Accelerometers 158b measure linear acceleration of movement of electronic device 100 in multiple axes (X, Y and Z). For example, accelerometers 158b can include three accelerometers, where one accelerometer measures linear acceleration in the X axis, one accelerometer measures linear acceleration in the Y axis, and one accelerometer measures linear acceleration in the Z axis. Accelerometers 158b can be used to calculate the orientation/position of electronic device 100 relative to the earth and can also be referred to as a gravity sensor. Gyroscope 158c measures rotation or angular rotational velocity of electronic device 100. IMU 158d measures force, angular rate, and orientation of electronic device 100, using a combination of accelerometers, gyroscopes, and magnetometers.

Proximity sensor 159a senses the presence of nearby objects. In one embodiment, proximity sensor 159a can be an infrared (IR) sensor that detects the presence of a nearby object, such as when electronic device 100 is in a pocket of a user. Electronic device 100 can also include one or more light sensors 159b, which detects the luminance and/or intensity (i.e., the amount) of ambient light surrounding the electronic device 100.

Referring again to FIG. 1A, I/O subsystem 150 includes output devices 160 such as, but not limited to, display(s) 161, lights 162, audio output devices 163, and vibratory and/or haptic output devices 164. In one or more embodiments, electronic device 100 includes an integrated display 161 which incorporates a tactile, touch screen interface that can receive user's tactile/touch input. As a touch screen device, integrated display 161 allows a user to provide input to and/or to control electronic device 100 by touching features within a user interface presented on integrated display 161. Tactile, touch screen interface (154) can be utilized as an input device. The touch screen interface 154 can include one or more virtual buttons or selectable affordances. In one or more embodiments, when a user applies a finger or stylus on the touch screen interface (154) in the region demarked by the virtual button, the touch of the region causes the processor 112 to execute code to implement a function associated with the virtual button. In some implementations, integrated display 161 is integrated into a front surface of electronic device housing 105 along with front image capturing devices (not specifically shown), while the higher quality ICDs are located or disposed on a rear surface of housing 105. Other embodiments provide for multiple integrated displays within electronic device 100 and references to display(s) 161 are assumed to refer to one or all of these multiple integrated displays.

Vibration/haptic output device 164 can cause electronic device 100 to vibrate or shake when activated. Vibration device 164 can be activated during an incoming call or message in order to provide an alert or notification to a user of electronic device 100. Audio output devices (e.g., a speaker) 163 can provide an audio alert or other audio output to a user. In one or more embodiments, integrated display 161, audio output devices (or speakers) 163, and vibration/haptic device 164 can generally and collectively be referred to as output devices.

With reference now to FIG. 1B and with continuing reference to FIG. 1A, there is presented another view of electronic device 100 with components enabling electronic device 100 to function as a mobile communication device, within an expanded communication environment 101B. In addition to the functional and operational components already presented by and described within the description of FIG. 1A, FIG. 1B further illustrates expanded communications subsystem 130 with additional communication components and interfaces enabling electronic device 100 to perform wireless communications within an expanded communication environment 101B that includes other devices.

Communications subsystem 130 includes global positioning system (GPS) module 131 that enables electronic device to communicate with and receive GPS location data from GPS satellite(s) 195. In one or more embodiments, GPS module 131 receives geospatial input from GPS broadcasts of time data and location data from GPS satellite(s) 195 to obtain geospatial location information about the physical location of electronic device 100.

In one or more embodiments, controller 110, via communications subsystem 130, performs multiple types of cellular over-the-air (OTA) or non-cellular wireless communication, such as by using a Bluetooth connection or other personal access network (PAN) connection. As shown, communications subsystem includes cellular communication system 132, which includes at least one radio frequency RF front end coupled to one or more antennas. In one or more embodiments, cellular communication system 132 can include a communication module with one or more baseband processors or digital signal processors, one or more modems, and a radio frequency (RF) front end having one or more transmitters and one or more receivers. In one or more embodiments, controller 110, via communications subsystem 130, may communicate via an OTA cellular connection with radio access networks (RANs) over a cellular wireless communication network (CWCN) 175. CWCN 175 can be a terrestrial network and include a plurality of base stations and associated network server(s) 176, in one embodiment. Cellular communication system 132 allows electronic device 100 to communicate wirelessly with CWCN 175 via transmissions of communication signals (represented as lightning bolts) to and from network communication devices, such as base stations or cellular nodes, of CWCN 175. Alternatively, or in addition, CWCN 175 can include a satellite network, and electronic device 100 connects to CWCN 175 using satellite communication system 133. Cellular communication system 132 and satellite communication system 133 enable electronic device 100 to engage in long distance wireless communication capabilities.

In one or more embodiments, communications subsystem 130 includes integrated short range wireless interface chipset 134 having one or more of Wi-Fi transceiver (TxRX) 135, Bluetooth (BT) TxRx 136, near field communication (NFC) transceiver 137, and ultra-wideband (UWB) transceiver 138. In one or more embodiments, the short-range communication devices are not integrated on a single chipset, but can be separately provided hardware components. In one or more embodiments, electronic device 100 can communicate wirelessly with external wireless devices, such as a WiFi router of a wireless local area network (WLAN) 178 and/or second electronic device 170, via one or more short-range wireless interface(s). Second electronic device 170 can be a communication device, such as a smartphone that is used by a second user 171, and/or can be similarly configured as electronic device 100. In one or more embodiments, electronic device 100 can receive Internet or Wi-Fi based calls, text messages, multimedia messages, and other notifications via a combination of wireless and wired networks (generally networks 182).

In one or more embodiments, networks 182 can include CWCN 175, WLAN 178, and Wide Area Network (WAN) 180, such as the Internet. In one or more embodiments, WAN 180 can enable electronic device 100 to access application servers 190, which can provide a downloadable version of CGP module 125 and/or access to other applications, online transactions, and resources. In one or more embodiments, networks 182 can also include personal area networks (PAN) 184, which are individually created with second devices via one of short-range wireless devices from among Wi-Fi TxRX 135, BT TxRx 136, NFC transceiver 137, and UWB transceiver 138. Example second devices include external display 165, wireless headset 166, and wearable computing device 192. External display 165 can be a stand-alone monitor/display or a display integrated into a second electronic device, such as a laptop computer. In at least one embodiment, connection to the external display 165 can be wired and can include an intermediate connection device, such as a docking station device. In one or more embodiments, wearable computing device 192, such as a smartwatch, fitness tracker, or the like, may be paired with electronic device 100, and provide biometric data such as heart rate, breathing rate, and the like, to the electronic device 100 via the paired communication link.

Electronic device 100 also includes a physical interface 106. Physical interface 106 of electronic device 100 can serve as a data port and can also be used as a power supply port that is coupled to charging circuitry 168, which feeds electrical power to device battery 169 to enable recharging of device battery 169 and/or powering of electronic device 100. As a data port, physical interface 106 can enable electronic device 100 to be physically coupled via a cable or docking station port to a second device, such as external display 165.

FIG. 1B also presents additional details of ICD(s) 152 of electronic device 100. Throughout the disclosure, the term image capturing device (ICD) is synonymous with and/or utilized interchangeably with any one of the cameras of electronic device 100. ICD(s) (or cameras) 152 include front cameras 152*a* and rear cameras 152*b*. In one embodiment, each of front cameras 152*a* and rear cameras 152*b* are communicatively coupled to ICD controller 116. ICD controller 116 supports the processing of image data from front cameras 152*a* and rear cameras 152*b*. Front cameras 152*a* can include a main camera 152*a*1 and a wide-angle camera 152*a*2. Rear cameras 152*b* can include a main camera 152*b*1, a wide-angle camera 152*b*2, and a telephoto camera 152*b*3. Both sets of cameras 152 include image sensors that can capture images that are within the field of view (FOV) of each respective camera 152. In one or more embodiments, one or more of the cameras can be utilized to enable biometric authentication using facial image or iris scan recognition.

In one embodiment, main cameras 152*a*1 and 152*b*1 can be low resolution (i.e., a low number of pixels) always on cameras (AoC) that continuously capture images and have a low level of power consumption. Wide-angle cameras 152*a*2, 152*b*2, and telephoto camera 152*b*3 can be high resolution cameras (i.e., a high number of pixels) that only capture images when triggered and have a higher level of power consumption.

In the description of each of the following figures, reference is also made to specific components illustrated within the preceding figure(s). Similar or same components are presented with the same leading reference number.

Figures 2A, 2B:
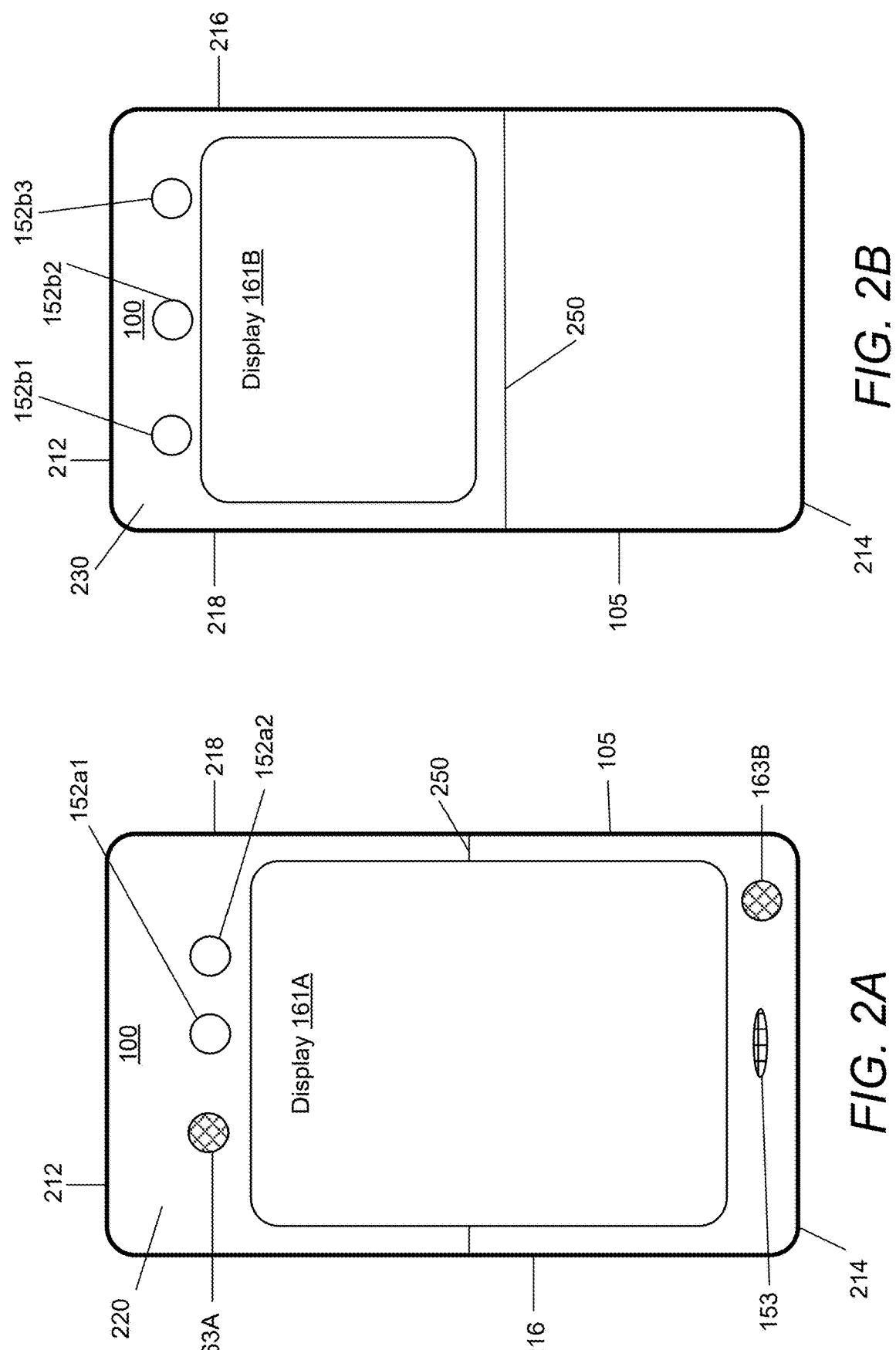
FIG. 2A is an example illustration of the front of an electronic device with a front display and multiple front cameras, according to one or more embodiments.
FIG. 2B is an example illustration of the rear of an electronic device with a rear display and multiple rear cameras, according to one or more embodiments.

Turning to FIG. 2A, additional details of the front surface of electronic device 100 are shown. Electronic device 100 includes a housing 105 that contains the components of electronic device 100. Housing 105 includes a top side 212, bottom side 214, and opposed sides 216 and 218. Housing 105 further includes a front surface 220. Electronic device 100 includes a front display 161A embedded in front surface 220 of housing 105. In some implementations, microphone 153, front display 161A, front cameras 152*a*1, 152*a*2 and audio output devices 163A and 163B are at least partially integrated or disposed into front surface 220. In one embodiment, electronic device 100 can be a foldable electronic device that folds in half along a hinge 250.

Electronic device 100 includes a first audio output device 163A and second audio output device 163B. The first audio output device 163A is disposed or located towards top side 212 of housing 105. The second audio output device 163B is disposed or located towards bottom side 214 of housing 105. Each of the audio output devices 163A and 163B are communicatively coupled to processor 112.

With additional reference to FIG. 2B, additional details of the rear surface of electronic device 100 are shown. Housing 105 further includes a rear surface 230. Electronic device 100 includes a rear display 161B embedded in rear surface 230 of housing 105. Various components of electronic device 100 are located or disposed on/at rear surface 230, including several rear cameras. In some implementations, rear display 161B, rear main camera 152*b*1, rear wide-angle camera 152*b*2, and rear telephoto camera 152*b*3 are at least partially integrated or disposed into rear surface 230. In one embodiment, electronic device 100 can fold in half along hinge 250. In the folded position, rear surface 230 becomes an outer surface of electronic device 100.

Referring to FIG. 3, there is shown one embodiment of example contents of memory subsystem 120 of electronic device 100. In the described embodiments, the contents of the memory are utilized to and/or configure electronic device 100 to complete the various processes described herein. Memory subsystem 120 includes program code/ instructions 121 including data, software, and/or firmware modules, such as operating system (OS) 122, firmware 123, and execution module(s) 124. Execution module(s) 124 include CGP module 125, AI models 126, and communication module 127.

CGP module 125 includes program code that is executed by processor 112 and configures processor 112 to enable/ cause electronic device 100 to perform the various features of the present disclosure. In one or more embodiments, CGP module 125 enables electronic device 100 to guide positioning of the electronic device during image capturing. In one or more embodiments, execution of CGP module 125 by processor 112 configures electronic device 100 to perform the processes presented in the flowchart of FIG. 6, as will be described below.

AI models 126 accelerate artificial intelligence, natural language processing (NLP), context evaluation (CE), and machine learning applications. Communication module 127 enables electronic device 100 to communicate and exchange data with other devices via networks 182.

Memory subsystem 120 includes motion data 320. Motion data 320 can be sensed and/or detected by one or more motion and other sensors 157 of electronic device 100. Motion data 320 indicates the spatial orientation and movement of electronic device 100. Motion data 320 includes first motion data 322 and second motion data 324.

Memory subsystem 120 includes image data 330. Image data 330 can be captured by one or more cameras 152 of electronic device 100. Image data 330 includes first preview image stream 332 and second preview image stream 334. In one embodiment, first preview image stream 332 and second preview image stream 334 can comprise multiple images that are captured over a period of time. First preview image stream 332 includes first preview image 332A that is extracted from the first preview image stream 332. Second preview image stream 334 includes second preview image 334A that is extracted from the second preview image stream 334.

In one example embodiment, first preview image 332A can include the faces of five subjects whose image is to be captured. First preview image 332A includes first eye level 332B of a first subject that is within a field of view of one or more cameras 152. First preview image 332A further includes second eye level 332C of a second subject, third eye level 332D of a third subject, fourth eye level 332E of a fourth subject, and fifth eye level 332F of a fifth subject. Second preview image 334A includes first eye level 334B of a first subject that is within a field of view of one or more cameras 152. Second preview image 334A further includes second eye level 334C of a second subject, third eye level 334D of a third subject, fourth eye level 334E of a fourth subject, and fifth eye level 334F of a fifth subject. In another example embodiment, first preview image 332A can include the face of one subject whose image is to be captured and only the first eye level 332B would be included in first preview image 332A and only first eye level 334B would be included in second preview image 334A.

In an embodiment, electronic device 100 can recognize a pair of eyes of each subject in first preview image 332A and determine the respective eye levels 332B-332F of each subject. Electronic device 100 can recognize five pairs of eyes in second preview image 334A and determine the respective eye levels 334B-334F. In one embodiment, eye levels 332B-332F and 334B-334F include the offset in the position and gaze of a subject's eyes, relative to a vertical height of the camera lens of electronic device 100.

In one embodiment, the eye levels can at least partially be defined as an angular value from the planar rear surface 230 of electronic device 100 to the eyes of a subject. In this example 0 degrees (or 0, 0 angle offset) can be defined as a straight ahead direction that is perpendicular to rear surface 230. A subject with eyes looking to the left of the electronic device can have a positive horizontal angular value (e.g., +15 degrees) and a subject looking to the right of the electronic device can have a negative horizontal angular value (e.g., −15 degrees). A subject with eyes directed upwards towards the electronic device can have a positive vertical angular value (e.g., +10 degrees) and a subject with eyes directed downwards towards the electronic device can have a negative vertical angular value (e.g., −30 degrees).

Memory subsystem 120 includes average eye level 336. Average eye level 336 is an average value of all the eye levels of the multiple subjects that are present in a single preview image. For first preview image 332A, the average eye level would be the average of eye levels 332B-332F.

Memory subsystem 120 includes first projection line 340, second projection line 342, and third projection line 344. First projection line 340 is the direction that a respective camera 152 is aligned with or is pointing toward at a first time, where the rear surface of the electronic device is generally perpendicular to the surface of the earth or to a horizontal surface the user is standing on. Second projection line 342 is the direction that a respective camera 152 is aligned with or is pointing toward at a later second time while the electronic device is in the same perpendicular orientation. Third projection line 344 is the direction that a respective camera 152 is aligned with or is pointing toward at a later third time while the electronic device is in the same perpendicular orientation. First projection line 340, second projection line 342, and third projection line 344 correspond to virtual lines extending in a substantially horizontal direction at a vertical height of the rear cameras 152 positioned to be pointed toward the faces of subjects whose image is to be captured.

In one example embodiment, first projection line 340 can correspond to the direction that rear main camera 152b1 is pointed toward at a first time. In one embodiment, projections lines 340-344 can be determined, based on motion data 320 sensed by motion sensors 157. Motion data 320 includes an orientation of the electronic device relative to the earth, which can also be referred to as a gravity vector. Projections lines 340-344, from a lens of the camera, can be determined based on an elevation level of the camera relative to a surface of the earth. Electronic device 100 can determine projections lines 340-344 based on the orientation of electronic device 100 relative to the earth.

Memory subsystem 120 includes first deviation angle 350, second deviation angle 352, and average deviation angle 354. Electronic device 100 calculates deviation angles based on eye levels relative to the determined projection lines. First deviation angle 350 is the angular difference between the first eye level 332B and the first projection line 340. Second deviation angle 352 is the angular difference between the second eye level 334D and the second projection line 342. Average deviation angle 354 is the angular difference between the average eye level 336 and the first projection line 340.

Memory subsystem 120 includes deviation angle range 358. Deviation angle range 358 is a range of deviation angle values above and below a mid-point or center angular value that are acceptable angular values for capturing an image that does not have any substantial distortion in the subject's facial image (i.e., the facial image is in proportion). In one example embodiment, deviation angle range 358 can be between −10 degrees and +10 degrees. In another example embodiment, deviation angle range 358 can be between −20 degrees and +20 degrees.

Memory subsystem 120 includes values for directions to move electronic device 360 and distances to move electronic device 370. Directions to move electronic device 360 are directions that electronic device 100 should be moved in order to bring one of cameras 152 into alignment with the eye level of the subject whose image is to be captured. Directions to move electronic device 360 are further directions that electronic device 100 should be moved to reduce the deviation angle to be within deviation angle range 358. Directions to move electronic device 360 are vertical directions relative to the earth such that, after being moved in the specific direction, electronic device 100 is in an improved alignment with the face of a subject, prior to capturing a persistent image. Directions to move electronic device 360 include first direction 362 at an initial time, second direction 364 at a second later time, and third direction 366 at a third later time.

Distances to move electronic device 370 are distances that electronic device 100 should be moved in a specific direction in order to bring an active camera (152) into alignment with the eye level of the subject whose image is to be captured. Distances to move electronic device 370 indicates a distance value that electronic device 100 should be moved to reduce the deviation angle to be within deviation angle range 358. Distances to move electronic device 370 are vertical distances calculated such that, after being moved the specific distance in the respective direction, electronic device 100 is in an improved alignment with the face of a subject, prior to capturing a persistent image. Distances to move electronic device 370 include first distance 372, second distance 374, and third distance 376.

Memory subsystem 120 includes audio message 380. Audio message 380 is output on audio output devices 163A, 163B to provide an audio directional indicator indicating the first direction 362 to move the electronic device to reduce the first deviation angle 350.

Memory subsystem 120 includes first persistent image 390 and second persistent image 392. First persistent image 390 and second persistent image 392 are images that are not temporary and are designated for retention or saving in memory subsystem 120 (or storage 140). In one example embodiment, persistent images 390, 392 can be automatically captured by electronic device 100 after determining that a current deviation angle (e.g., first deviation angle 350) is within the deviation angle range 358. In alternate embodiments, persistent images 390, 392 can be manually captured by a user depressing a physical button on an external surface of the device or selecting a virtual image capture icon presented on the device display screen.

Figure 4A:
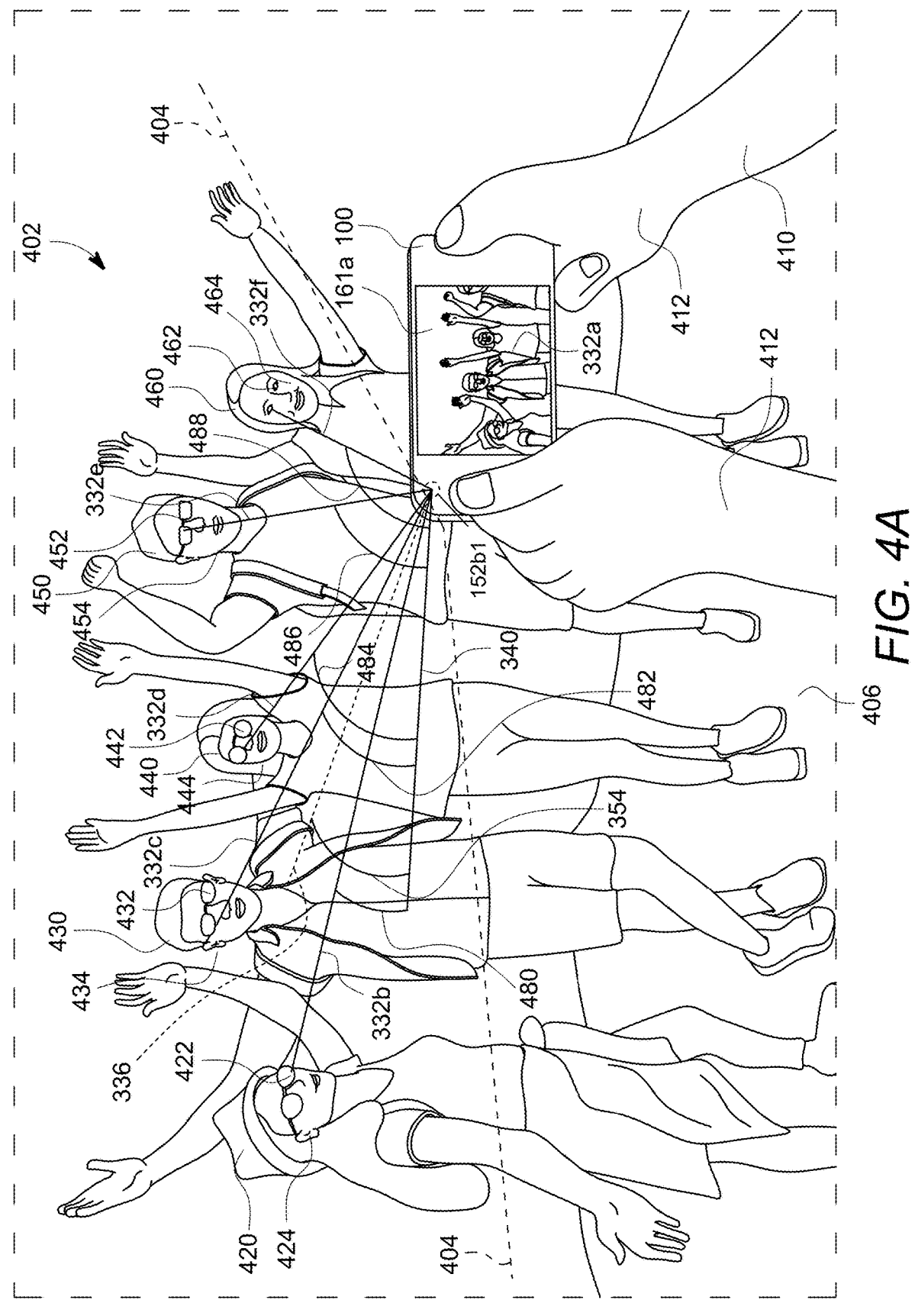
FIG. 4A illustrates an example electronic device in an image capturing mode with several subjects whose image is visible in a field of view of a rear camera, according to one or more embodiments.

Referring to FIG. 4A, electronic device 100 has been positioned by an electronic device user 410 to capture an image of scene 402. The rear cameras 152b1, 152b2, and 152b3 face several individuals or subjects 420, 430, 440, 450, and 460 whose image is to be captured. Subjects 420, 430, 440, 450, and 460 are standing on the ground or earth 406. Electronic device user 410 is holding electronic device 100 in their hands 412. Electronic device user 410 can view front display 161A, which is presenting at least a portion of captured first preview image stream 332. Rear main camera 152b1 has a FOV 404 that can capture an image of scene 402. Rear main camera 152b1 is oriented along first projection line 340. First projection line 340 corresponds to the a virtual line extending in a horizontal direction at a vertical height of rear main camera 152b1 positioned to be pointed toward the faces of subjects within the scene 492, at an initial/first time.

Rear main camera 152b1 can capture first preview image stream 332 including first preview image 332A with subjects 420, 430, 440, 450, and 460 within scene 492 that is being captured. Subject 420 has a face 424 with a pair of eyes 422, subject 430 has a face 434 with a pair of eyes 432, subject 440 has a face 444 with a pair of eyes 442, subject 450 has a face 454 with a pair of eyes 452, and subject 460 has a face 464 with a pair of eyes 462. Each of subjects 420, 430, 440, 450, and 460 has an associated eye level that has been determined by electronic device 100. Subject 420 has a first eye level 332B. Subject 430 has a second eye level 332C. Subject 440 has a third eye level 332D. Subject 450 has a fourth eye level 332E and subject 460 has a fifth eye level 332F. In one embodiment, eye levels 332B-332F include the vertical offset position of a subject's eyes relative to electronic device 100.

FIG. 4A illustrates several deviation angles superimposed on the example scene of the photo capturing process using electronic device 100. In FIG. 4A, deviation angle 480 is shown as the vertical angular difference between the first eye level 332B and the first projection line 340. In one embodiment, deviation angle 480 can correspond to first deviation angle 350. Deviation angle 482 is shown as the vertical angular difference between the second eye level 332C and the first projection line 340. In one embodiment, deviation angle 482 can correspond to second deviation angle 352. Deviation angle 484 is shown as the vertical angular difference between the third eye level 332D and the first projection line 340. Deviation angle 486 is shown as the vertical angular difference between the fourth eye level 332E and the first projection line 340. Deviation angle 488 is shown as the vertical angular difference between the fifth eye level 332F and the first projection line 340. In one embodiment, if only subject 430 is present in scene 402, deviation angle 482 can correspond to first deviation angle 350 at a first time.

In FIG. 4A, the average eye level 336 is calculated as the average of eye levels 332B, 332C, 332D, 332E, and 332F. The average deviation angle 354 is shown as the vertical angular difference between the average eye level 336 and the first projection line 340.

In some embodiments at least one of front cameras 152a can be used to capture second preview image stream 334, such as when a user 410 of the electronic device is taking a self-photo or is taking a self-photo with other subjects. In this example embodiment, the front camera would have a projection line and the user 410 would have an eye level.

In some embodiments where multiple subjects are present in a scene, one of the subjects can be a primary subject that is selected for the camera to focus on. The eye level of the primary subject is then used to determine the deviation angle and the distance and direction adjustment recommendations provided to the electronic device user to move the electronic device into an optimal alignment with the primary subject.

Turning to FIG. 4B, rear camera 152b1 of electronic device 100 is shown capturing a preview image of a single subject 420. Subject 420 has a pair of eyes 422. First projection line 340 corresponds to a virtual line extending in a substantially horizontal direction at a vertical height of the rear camera 152b1 positioned to be pointed toward the face of subject 420. First projection line 340 is substantially parallel to the surface of the earth 406. Eye level 332B corresponds to an angular value from the camera lens of electronic device 100 to the eyes 422 of subject 420. In FIG. 4B, the eyes 422 of subject 420 are not in alignment with the lens of rear camera 152b1. Deviation angle 480 is calculated as the vertical angular difference between the first eye level 332B and the first projection line 340. When deviation angle 480 is not within the deviation angle range 358, electronic device 100 can determine a first direction 362 and distance 372 to move the electronic device to reduce deviation angle 480 such that, after being moved the first distance 372 in the first direction 362 by an electronic device user, the electronic device is in an improved alignment with the face 424 of the subject 420.

Figure 5A:
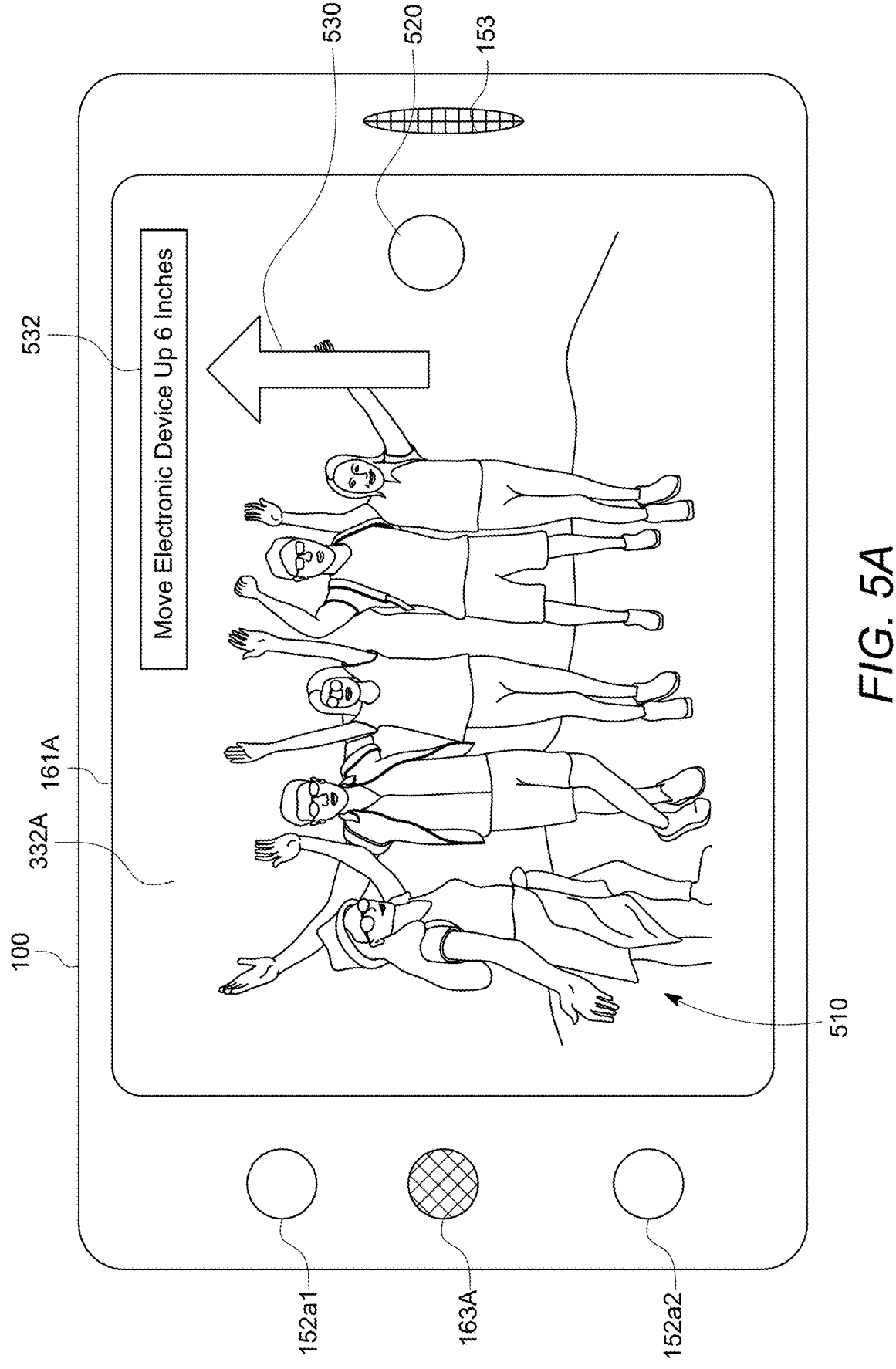
FIG. 5A illustrates an example camera guiding and positioning graphical user interface presented on a display of an electronic device, according to one or more embodiments.

With reference to FIG. 5A, electronic device 100 is shown with an example camera guiding and positioning graphical user interface (GUI) 510 presented on front display 161A. In one embodiment, when electronic device 100 is in an image capturing mode, camera guiding and positioning GUI 510 can be presented to electronic device user 410 to guide the user on how to move electronic device 100 to capture an optimal image of a subject without facial distortion. In an embodiment, after an image capturing mode of electronic device 100 has been initiated, camera guiding and positioning GUI 510 can be presented on front display 161A.

Camera guiding and positioning GUI 510 includes at least a portion of first preview image 332A with subjects 420, 430, 440, 450, and 460 and a virtual image capture icon 520 located on the front display screen 161A. Camera guiding and positioning GUI 510 includes a directional indicator 530 that indicates the direction (e.g., first direction 362) to move the electronic device to reduce the average deviation angle 354 such that the rear main camera 152b1 is in a better alignment with the eyes of one or more of the subjects. In FIG. 5A, directional indicator 530 is shown as an upward pointing arrow. In one embodiment, when the respective deviation angle is not within the deviation angle range 358, directional indicator 530 can be color-coded red (or other color) to indicate that the electronic device is not in an optimal alignment for image capture. Alternatively or additionally, directional indicator 530 can be otherwise highlighted by flashing or other means, in order to alert the user of the need to make the adjustment in the device position prior to capturing the image.

Camera guiding and positioning GUI 510 further includes a message 532 that indicates the direction (e.g., first direction 362) to move the electronic device and a distance (e.g., first distance 372) to move the electronic device to reduce the average deviation angle 354 such that the rear main camera 152b1 is in a better alignment with the eyes of one or more of the subjects. First distance 372 can be presented as a numeric value, such as "10 inches".

In one embodiment, electronic device 100 can also present an audio message 380, via audio output device 163A, that includes the direction and distance to move the electronic device to reduce the average deviation angle 354 such that the rear main camera 152b1 is in a better alignment with the eyes of one or more of the subjects. In an embodiment, electronic device 100 outputs audio message 380 contemporaneously with presenting directional indicator 530 and message 532.

Figure 5B:
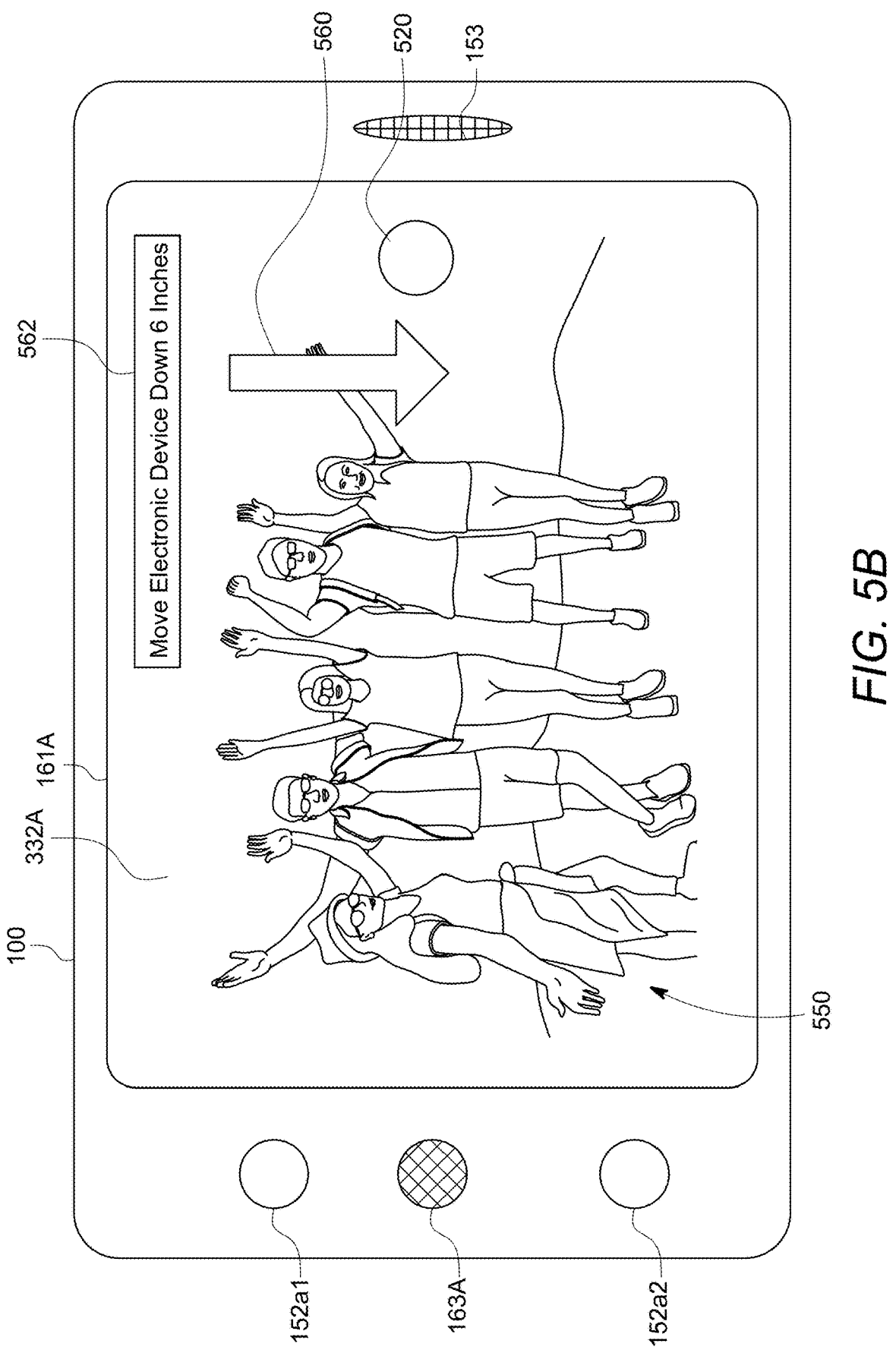
FIG. 5B illustrates another example camera guiding and positioning graphical user interface presented on a display of an electronic device, according to one or more embodiments.

With reference to FIG. 5B, electronic device 100 is shown with an example camera guiding and positioning graphical user interface (GUI) 550 presented on front display 161A. Camera guiding and positioning GUI 550 includes at least a portion of first preview image 332A and a directional indicator 560 that indicates the direction (e.g., second direction 364) to move the electronic device to reduce the average deviation angle 354 such that the rear main camera 152b1 is in a better alignment with the eyes of one or more of the subjects. In FIG. 5B, directional indicator 560 is shown as a downward pointing arrow.

Camera guiding and positioning GUI 510 further includes a message 562 that indicates the direction (e.g., second direction 364) to move the electronic device and a distance (e.g., second distance 374) to move the electronic device to reduce the average deviation angle 354 such that the rear main camera 152b1 is in a better alignment with the eyes of one or more of the subjects.

Figure 5C:
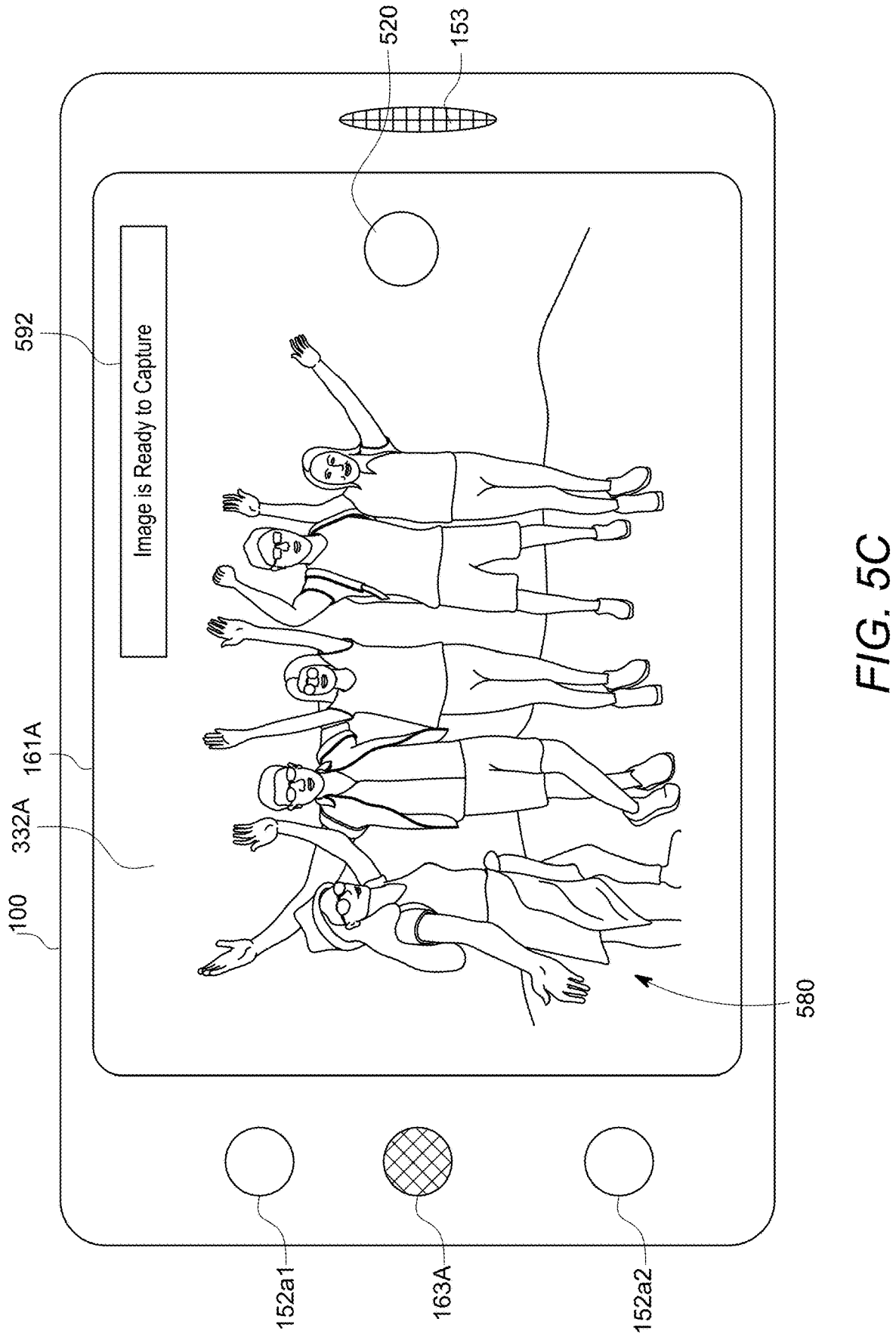
FIG. 5C illustrates an additional example camera guiding and positioning graphical user interface presented on a display of an electronic device, according to one or more embodiments.

With reference to FIG. 5C, electronic device 100 is shown with an example camera guiding and positioning graphical user interface (GUI) 580 presented on front display 161A after electronic device user 410 has moved the electronic device sufficiently in the indicated direction and distance to capture an optimal image of one or more subjects without facial distortion. In FIG. 5C, electronic device 100 has been moved such that the average deviation angle 354 has been reduced and is now within the deviation angle range 358.

Camera guiding and positioning GUI 580 further includes a message 592 that indicates the rear camera is in an optimal alignment for image capture and that the image is ready for capture. In one embodiment, when the respective deviation angle is within the deviation angle range 358, message 592 can be color-coded green (or another color) to indicate that the electronic device is in an optimal alignment for image capture. In one embodiment, electronic device 100 can also present an audio message 380, via audio output device 163A, that the image is ready for capture.

In one example embodiment, persistent images 390, 392 can be automatically captured by electronic device 100 after determining that the average deviation angle 354 is within the deviation angle range 358 and that the image is ready for capture. In another embodiments, persistent images 390, 392 can be manually captured by a user selecting virtual image capture icon 520 located on the device display screen.

According to one aspect of the disclosure, while electronic device 100 is in a first image capturing mode using a first camera 152b1, electronic device 100 extracts a first preview image 332A from a first preview image stream 332 being captured via the first camera 152b1. Electronic device 100 determines if the first preview image 332A contains a face 424 of at least one subject 420 whose image is to be captured. In response to determining the first preview image contains the face of the at least one subject, electronic device 100 determines a first eye level 332B of the at least one subject, calculates a first deviation angle 350 based on the first eye level 332B and a first projection line 340 of a lens of the first camera 152b1, and determines if the first deviation angle 350 is within a deviation angle range 358. In response to determining the first deviation angle 350 is not within the deviation angle range 358, electronic device 100 determines a first direction 362 to move the electronic device to reduce the first deviation angle such that, after being moved in the first direction 362, the electronic device is in an improved alignment with the face 424 of the at least one first subject 420. Electronic device 100 outputs an indication (e.g., directional indicator 530, message 532) to a user of the electronic device to move the electronic device in the first direction 362.

According to another aspect of the disclosure, in response to determining the first deviation angle 350 is within the deviation angle range 358, electronic device 100 outputs an indication (e.g., message 592) to a user of the electronic device that the electronic device is in an optimal alignment, with the face of the at least one first subject, to capture a first persistent image 390.

According to an additional aspect of the disclosure, in response to determining the first deviation angle 350 is within the deviation angle range 358, electronic device 100 autonomously captures a first persistent image 390, via the first camera 152b1, and stores the first persistent image 390 to the memory.

According to one more aspect of the disclosure, to output the indication to a user of the electronic device to move the electronic device in the first direction 362, electronic device 100 presents a first graphical user interface (GUI) 510 on front display 161A. The first GUI includes at least a portion of the first preview image 332A captured via the first camera and a first directional indicator 530 indicating the first direction 362 to move the electronic device to reduce the first deviation angle 350.

According to yet another aspect of the disclosure, electronic device 100 determines a first distance 372 to move the electronic device in the first direction 362 to reduce the first deviation angle 350 and outputs an indication to a user of the electronic device to move the electronic device the first distance in the first direction.

According to a further aspect of the disclosure, electronic device 100 outputs, via at least one audio output device 163A, a first audio directional indicator (i.e., audio message 380) indicating the first direction 362 to move the electronic device to reduce the first deviation angle.

According to an aspect of the disclosure, electronic device 100 receives first motion data 322 from the least one motion sensor 157 and determines the first projection line 340 based on the first motion data 322. Electronic device 100 determines an angle difference between the first eye level 332B and the first projection line 340 to obtain the first deviation angle 350.

According to one or more additional aspect(s) of the disclosure, in response to detecting completion of movement of the electronic device, electronic device 100 extracts a preview image 334A from a second preview image stream 334 being captured via the first camera. Electronic device 100 determines a second eye level 334B based on the second preview image. Electronic device 100 receives second motion data 324 from the least one motion sensor 157 and determines a second projection line 342 based on the second motion data 324. In one embodiment, second projection line 342 is determined, based on orientation data of the electronic device contained within second motion data 324. Electronic device 100 calculates a second deviation angle 352 based on the second eye level 334B and the second projection line 342. Electronic device 100 determines if the second deviation angle 352 is within the deviation angle range 358. In response to determining the second deviation angle is not within the deviation angle range, electronic device 100 determines a second direction 364 to move the electronic device to reduce the second deviation angle. Electronic device 100 outputs an indication (e.g., directional indicator 560, message 562) to a user of the electronic device to move the electronic device in the second direction 364.

According to a still further aspect of the disclosure, electronic device 100 determines if the first preview image 332A contains the face 434 of a second subject 430 whose image is to be captured and whose eyes have a second eye level 332C. Electronic device 100 determines an average eye level 336 based on the first eye level 332B and the second eye level 332C. Electronic device 100 calculates a third deviation angle based on the average eye level 336 and the first projection line 340 of the first camera. Electronic device 100 determines if the third deviation angle is within a deviation angle range 358. In response to determining the third deviation angle is not within the deviation angle range 358, electronic device 100 determines a third direction 366 and distance 376 to move the electronic device to reduce the third deviation angle. Electronic device 100 outputs an indication to a user of the electronic device to move the electronic device in the third direction 366 and the third distance 376. It is appreciated that the third direction is in a same vertical direction as one of the first direction or the second direction, but with a different offset value.

According to an added aspect of the disclosure, the first direction 362 is in a vertical direction relative to the earth 406 such that, after being moved in the first direction 362, electronic device 100 is in an improved alignment with the face of the at least one first subject, prior to capturing a first persistent image 390.

According to an extra aspect of the disclosure, the first projection line 340 is a substantially horizontal virtual projection line that is substantially parallel to the surface of the earth 406 and the first eye level 332B is determined relative to the surface of the earth.

Figure 6:
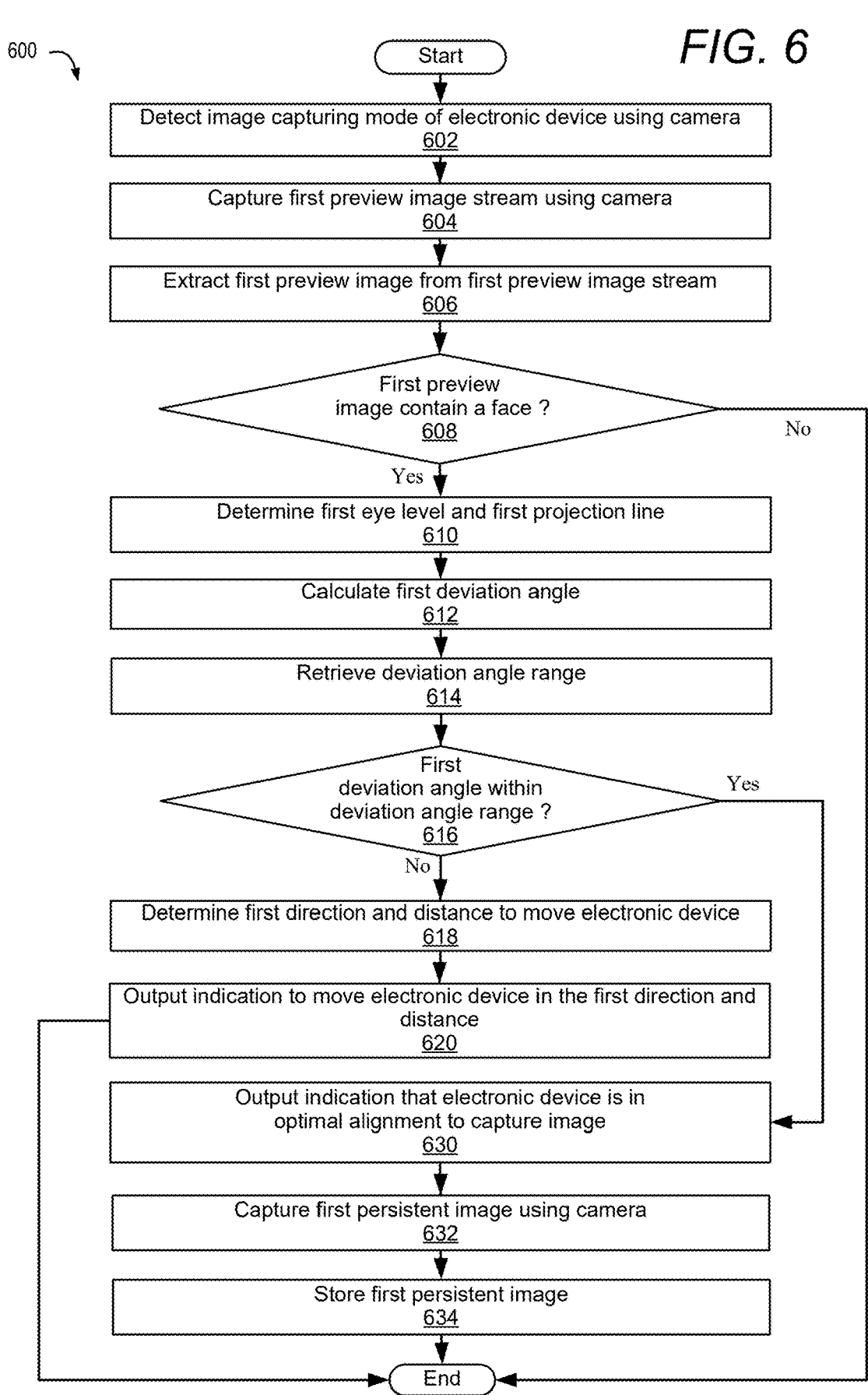
FIG. 6 depicts a flowchart of a method by which an electronic device guides positioning of the electronic device during image capturing, according to one or more embodiments.

FIG. 6 depicts a flow chart presenting method 600 by which electronic device 100 guides positioning of the electronic device during image capturing. The description of method 600 will be described with reference to the components and examples of FIGS. 1-5C. The operations depicted in FIG. 6 can be performed by electronic device 100 or any suitable electronic device that includes the one or more functional components of electronic device 100 that provide/enable the described features. One or more of the processes of the methods described in FIG. 6 may be performed by processor 112 executing program code associated with CGP module 125.

With specific reference to FIG. 6, method 600 begins at the start block. At block 602, method 600 includes detecting that electronic device 100 is in a first image capturing mode using at least one of front cameras 152a or rear cameras 152b. Method 600 includes capturing a first preview image stream 332 via one of the cameras (block 604). Method 600 includes extracting a first preview image 332A from the first preview image stream 332 (block 606).

Method 600 includes determining if the first preview image 332A contains a face 424 of at least one first subject 420 (decision block 608). In response to determining that the first preview image 332A does not contain a face 424, method 600 ends at the end block. In response to determining that the first preview image 332A contains a face 424, method 600 includes determining first eye level 332B based on the first preview image 332A and determining the first projection line 340 based on first motion data 322 (block 610). Electronic device 100 can recognize a pair of eyes of subject 420 in first preview image 332A and determine eye level 332B. Eye level 332B includes the offset in the position and gaze of a subject's eyes, relative to a vertical height of the camera lens of electronic device 100. Electronic device 100 can determine projection line 340, based on orientation information of the electronic device contained within motion data 320.

Method 600 includes calculating first deviation angle 350 based on the first eye level 332B and a first projection line 340 (block 612) and retrieving deviation angle range 358 (block 614). Method 600 includes determining if the first deviation angle 350 is within deviation angle range 358 (decision block 616). In response to determining the first deviation angle 350 is not within the deviation angle range 358, method 600 includes determining a first direction 362 and distance 372 to move the electronic device to reduce the first deviation angle such that, after being moved a first distance 372 in the first direction 362, the electronic device is in an improved alignment with the face 424 of the at least one first subject 420 (block 618) Method 600 includes outputting an indication (e.g., directional indicator 530, message 532), via display 161A, to a user of the electronic device to move the electronic device in the first direction 362 by the first distance 372 (block 620). The process of determining a direction and distance to move the electronic device and outputting an indication to prompt the user to move the electronic device can continue for a set number of iterations (e.g., 4 times) before the process terminates with a notification (of successful alignment or non-alignment) to the user. Method 600 terminates at the end block.

In response to determining the first deviation angle 350 is within the deviation angle range 358, method 600 includes outputting an indication (e.g., message 592), via display 161A, to a user of the electronic device, that the electronic device is in an alignment to capture an image of the subject (block 630). Method 600 includes initiating capture of first persistent image 390 of at least one subject using one of the cameras (block 632) and storing the first persistent image 390 to memory subsystem 120 (block 634). In one alternate embodiment, in lieu of automated capture of the persistent image, method 600 can include notifying the user that the electronic device is in an acceptable alignment to capture an image of the subject. Method 600 terminates at the end block.

The disclosure provides improvements in the use of cameras within an electronic device by enabling an electronic device to calculate a deviation angle based on an eye level and a projection line of a lens of the camera and determine if the deviation angle is within a deviation angle range. Additional benefits include enabling an electronic device to, in response to determining the deviation angle is not within the deviation angle range, determine a first direction to move the electronic device to reduce the deviation angle and output an indication to move the electronic device in the first direction. Further, the disclosure enables an electronic device to autonomously capture an image, when the deviation angle is within the deviation angle range.

In the above-described methods of FIG. 6, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined primarily by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:

at least one camera, including a first camera that has a first projection line from a lens of the first camera, based on an elevation level of the first camera relative to a surface of the earth;

at least one display, including a first display;

a memory having stored thereon a camera guiding and positioning (CGP) module for guiding positioning of the electronic device during image capturing; and at least one processor communicatively coupled to the at least one camera, the at least one display, and the memory, and which executes program code of the CGP module, the at least one processor configured to cause the electronic device to:

while the electronic device is in a first image capturing mode using the first camera, extract a first preview image from a first preview image stream being captured via the first camera;

determine if the first preview image contains a face of at least one first subject whose image is to be captured, the at least one first subject having a first eye level;

in response to determining the first preview image contains the face of the at least one first subject, calculate a first deviation angle based on the first eye level and the first projection line of the lens of the first camera;

determine if the first deviation angle is within a deviation angle range; and in response to determining the first deviation angle is not within the deviation angle range:

determine a first direction to move the electronic device to reduce the first deviation angle such that, after being moved in the first direction, the electronic device is in an improved alignment with the face of the at least one first subject; and output an indication to a user of the electronic device to move the electronic device in the first direction.

2. The electronic device of claim 1, wherein the at least one processor is configured to cause the electronic device to:

in response to determining the first deviation angle is within the deviation angle range, output the indication to the user of the electronic device that the electronic device is in an optimal alignment, with the face of the at least one first subject, to capture a first persistent image.

3. The electronic device of claim 1, wherein the at least one processor is configured to cause the electronic device to:

in response to determining the first deviation angle is within the deviation angle range:

autonomously capture a first persistent image, via the first camera; and store the first persistent image to the memory.

4. The electronic device of claim 1, wherein to output the indication to the user of the electronic device to move the electronic device in the first direction, the at least one processor is configured to cause the electronic device to:

present a first graphical user interface (GUI) on the first display, the first GUI including at least a portion of the first preview image stream captured via the first camera and a first directional indicator indicating the first direction to move the electronic device to reduce the first deviation angle.

5. The electronic device of claim 4, wherein the at least one processor is configured to cause the electronic device to:

determine a first distance to move the electronic device in the first direction to reduce the first deviation angle; and output the indication to the user of the electronic device to move the electronic device the first distance in the first direction.

6. The electronic device of claim 1, further comprising:

at least one audio output device that is communicatively coupled to the at least one processor, and wherein to output the indication to the user of the electronic device to move the electronic device in the first direction, the at least one processor is configured to cause the electronic device to:

output, via the at least one audio output device, a first audio directional indicator indicating the first direction to move the electronic device to reduce the first deviation angle.

7. The electronic device of claim 1, further comprising:

at least one motion sensor that is communicatively coupled to the at least one processor, and wherein to calculate the first deviation angle, the at least one processor is configured to cause the electronic device to:

receive first motion data from the least one motion sensor;

determine the first projection line based on the first motion data; and determine an angle difference between the first eye level and the first projection line to obtain the first deviation angle.

8. The electronic device of claim 1, further comprising:

at least one motion sensor that is communicatively coupled to the at least one processor, the at least one processor configured to cause the electronic device to:

in response to detecting movement of the electronic device:

extract a second preview image from a second preview image stream being captured via the first camera;

determine a second eye level based on the second preview image;

receive second motion data from the least one motion sensor;

determine a second projection line based on the second motion data;

calculate a second deviation angle based on the second eye level and the second projection line;

determine if the second deviation angle is within the deviation angle range; and in response to determining the second deviation angle is not within the deviation angle range:

determine a second direction to move the electronic device to reduce the second deviation angle; and output an indication to a user of the electronic device to move the electronic device in the second direction.

9. The electronic device of claim 1, wherein the at least one processor is configured to cause the electronic device to:

determine if the first preview image contains the face of a second subject whose image is to be captured, the second subject having a second eye level;

determine an average eye level based on the first eye level and the second eye level;

calculate a third deviation angle based on the average eye level and the first projection line of the first camera;

determine if the third deviation angle is within the deviation angle range; and in response to determining the third deviation angle is not within the deviation angle range:

determine a third direction to move the electronic device to reduce the third deviation angle; and output an indication to a user of the electronic device to move the electronic device in the third direction.

10. The electronic device of claim 1, wherein the first direction is in a vertical direction relative to the earth such that, after being moved in the first direction, the electronic device is in an improved alignment with the face of the at least one first subject, prior to capturing a first persistent image.

11. The electronic device of claim 1, wherein the first projection line is a substantially horizontal virtual projection line that is substantially parallel to the surface of the earth and the first eye level is determined relative to the surface of the earth.

12. A method comprising:

while an electronic device is in a first image capturing mode using a first camera:

extracting, via at least one processor, a first preview image from a first preview image stream being captured via the first camera;

determining if the first preview image contains a face of at least one first subject whose image is to be captured, the at least one first subject having a first eye level;

in response to determining the first preview image contains the face of the at least one first subject, calculating a first deviation angle based on the first eye level and a first projection line of a lens of the first camera;

determining if the first deviation angle is within a deviation angle range; and in response to determining the first deviation angle is not within the deviation angle range:

determining a first direction to move the electronic device to reduce the first deviation angle such that, after being moved in the first direction, the electronic device is in an improved alignment with the face of the at least one first subject; and outputting an indication to a user of the electronic device to move the electronic device in the first direction.

13. The method of claim 12, further comprising:

in response to determining the first deviation angle is within the deviation angle range, outputting the indication to the user of the electronic device that the electronic device is in an optimal alignment, with the face of the at least one first subject, to capture a first persistent image.

14. The method of claim 12, further comprising:

in response to determining the first deviation angle is within the deviation angle range:

autonomously capturing a first persistent image, via the first camera; and storing the first persistent image to a memory.

15. The method of claim 12, wherein to output the indication to the user of the electronic device to move the electronic device in the first direction, the method further comprises:

presenting a first graphical user interface (GUI) on a first display, the first GUI including at least a portion of the first preview image stream captured via the first camera and a first directional indicator indicating the first direction to move the electronic device to reduce the first deviation angle.

16. The method of claim 15, further comprising:

determining a first distance to move the electronic device in the first direction to reduce the first deviation angle; and outputting the indication to the user of the electronic device to move the electronic device the first distance in the first direction.

17. The method of claim 12, further comprising:

outputting, via at least one audio output device, a first audio directional indicator indicating the first direction to move the electronic device to reduce the first deviation angle.

18. The method of claim 12, wherein to calculate the first deviation angle, the method further comprises:

receiving first motion data from at least one motion sensor;

determining the first projection line based on the first motion data; and determining an angle difference between the first eye level and the first projection line to obtain the first deviation angle.

19. The method of claim 12, further comprising:

in response to detecting movement of the electronic device:

extracting a second preview image from a second preview image stream being captured via the first camera;

determining a second eye level based on the second preview image;

receiving second motion data from at least one motion sensor;

determining a second projection line based on the second motion data;

calculating a second deviation angle based on the second eye level and the second projection line;

determining if the second deviation angle is within the deviation angle range; and in response to determining the second deviation angle is not within the deviation angle range:

determining a second direction to move the electronic device to reduce the second deviation angle; and outputting the indication to the user of the electronic device to move the electronic device in the second direction.

20. A computer program product comprising:

a computer readable storage device having stored thereon program code which, when executed by at least one processor of an electronic device having at least one camera and at least one display, configures the electronic device to complete the functionality of:

while an electronic device is in a first image capturing mode using a first camera:

extracting a first preview image from a first preview image stream being captured via a first camera;

determining if the first preview image contains a face of at least one first subject whose image is to be captured, the at least one first subject having a first eye level;

in response to determining the first preview image contains the face of the at least one first subject, calculating a first deviation angle based on the first eye level and a first projection line of a lens of the first camera;

determining if the first deviation angle is within a deviation angle range; and in response to determining the first deviation angle is not within the deviation angle range:

determining a first direction to move the electronic device to reduce the first deviation angle such that, after being moved in the first direction, the electronic device is in an improved alignment with the face of the at least one first subject; and outputting an indication to a user of the electronic device to move the electronic device in the first direction.

\* \* \* \* \*